Figure 1:
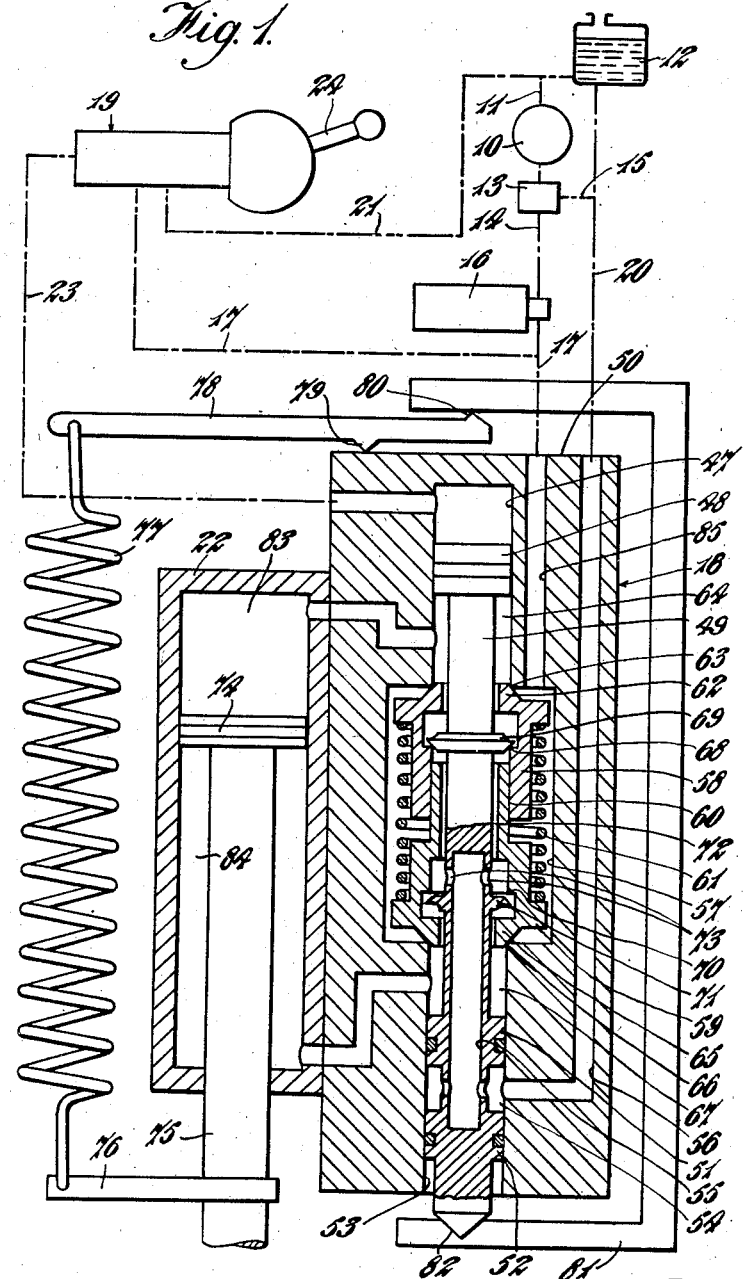

May 27, 1941.  P. W. THORNHILL  2,243,781
FLUID PRESSURE REMOTE CONTROL SYSTEM
Filed April 5, 1940  2 Sheets-Sheet 1

Inventor:
P. W. Thornhill
By: Stevens & Davis
Attys.

Patented May 27, 1941

2,243,781

UNITED STATES PATENT OFFICE 2,243,781

FLUID PRESSURE REMOTE CONTROL SYSTEM

Peter Warborn Thornhill, London, England, assignor to Automotive Products Company Limited, London, England Application April 5, 1940, Serial No. 328,158
In Great Britain April 1, 1939

5 Claims. (Cl. 121—41)

This invention relates to fluid pressure remote control systems of the kind in which a servo unit is actuated by pressure fluid from a source of supply, such as a continuously driven pump or a hydraulic accumulator, said pressure fluid being under the control of a valve device adapted to cause the servo unit to move to any desired position within its operating range.

It is the object of the present invention to provide an improved form of system in which the extent of movement of the servo unit is determined in advance by the control valve device. For example, a lever serving to actuate said control valve device may be movable through a predetermined range, every point within which corresponds to a prescribed setting of the servo unit, the arrangement being such that movement of the lever to a certain point within said range automatically causes the servo unit to move to a corresponding position within its own range of movement.

According to the present invention regarded broadly, in a fluid pressure remote control system of the kind above referred to, the control valve device is arranged to deliver fluid to the servo unit at a pressure which depends upon the position of the control member of said valve device. Thus the control valve device may comprise pressure regulating means adapted to maintain a pipeline leading from the control valve device at a pressure the value of which is predetermined and depends upon the position of the control member.

According to a further feature of the invention a fluid pressure remote control system is provided comprising in combination a source of pressure fluid, a control valve arranged to regulate the pressure of the fluid from said source to a predetermined value depending upon the position to which a control member is set, a servo valve, and a double-acting servo unit, the servo valve being arranged to connect one working space or the other of the servo unit to the source of pressure fluid and being itself operated by pressure fluid received from the control valve device.

The invention is of course applicable to remote control systems utilising a gaseous working fluid, as the operation of the system is dependent largely upon the fluid pressure which exists in a pipeline joining the control valve device with the servo valve. In its preferred form, however, the system is operated by pressure liquid.

Thus in a liquid pressure remote control system of the kind above referred to, according to the invention a pressure regulating valve receives pressure liquid from a source such as a pump or hydraulic accumulator, and regulates the pressure thereof to an extent depending upon the position to which a control member is set, the said liquid under regulated pressure being fed to a servo valve which is actuated in one direction by the pressure liquid received from the control valve device, and in the other direction by a spring, the force of which latter is modified by movement of the movable part of the servo unit, said servo valve being arranged to regulate the supply of pressure liquid to the servo unit, and thereby cause the latter to assume a position corresponding with the prevailing setting of the control member. The control valve device and the servo valve may each have a pair of pipelines, one leading to the source of pressure liquid and the other to the inlet of the pump and/or a liquid reservoir, said control valve device and servo valve being connected together by a single variable pressure pipeline serving to carry liquid the pressure of which is determined by the position of the control member.

Preferably the control valve device comprises a pair of coaxial valve members, one of which regulates the flow of liquid from the source along a variable pressure pipeline to the servo valve and the second cooperates with the first to form a valve which, when opened, allows pressure liquid to escape from said variable pressure pipeline to the pump inlet or the reservoir.

Also in its preferred form the servo valve comprises a valve device which is arranged to connect the pressure and return pipelines with the working spaces of the servo unit to actuate the latter in either direction, and is also adapted to cut off the pressure supply from the servo unit when the latter reaches a setting corresponding to the position occupied at the time by the control member.

Figure 2:
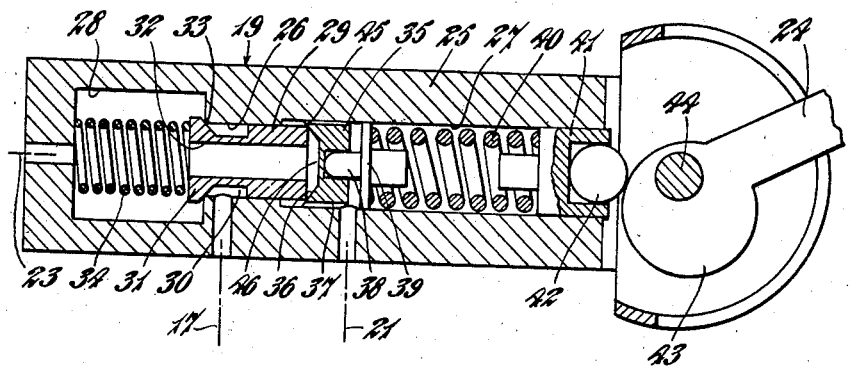

One form of liquid pressure remote control system is described by way of example in the accompanying diagrammatic drawings, in which:

Figure 1 is a general view of the system, the servo valve and its associated servo cylinder unit being shown in section to a scale considerably larger than the other components of the system; and Figure 2 is a sectional elevation of the control valve device.

The remote control system shown in Figure 1 is of elementary form and comprises a pump 10 which is continuously driven, conveniently from the engine when the system is utilised in an aircraft. The inlet 11 of the pump 10 is fed from a reservoir 12, while its outlet leads to a cut-out valve 13 of the known form adapted normally to deliver the pressure liquid through a pipeline 14, but when the pressure in the latter reaches a predetermined value, to divert the pump delivery through a connection 15 leading back to the reservoir 12. A hydraulic accumulator 16 is arranged normally to be maintained in a fully charged condition by the pump 10 and its outlet is connected by a pressure pipeline 17 with a servo valve indicated generally at 18 and with a control valve device indicated generally at 19. These two components are also connected with the reservoir 12 by pipelines 20 and 21 respectively. The servo valve 18 is associated with a double-acting servo cylinder unit 22 to which it is mechanically interconnected, as will be hereinafter explained.

The control valve device 19 is connected by a variable pressure pipeline 23 with the servo valve 18 and it is provided with an angularly movable control member 24 in the form of a handle adapted to be placed manually in any position within its normal range of operative movement. The control valve device 19 acts to regulate the pressure of the liquid received through the pipeline 17 and to communicate said regulated pressure to the liquid within the pipeline 23, the extent of the pressure regulation being dependent upon the position which is occupied at the time by the control member 24.

The internal construction of the control valve device is shown in Figure 2 and it comprises a body 25 which is formed with two coaxial bores 26 and 27 leading into an end cavity 28, to which latter the variable pressure pipeline 23 is connected. In the bore 26 a first valve member 29 is fitted slidably at its rear part, said valve member being formed with a waist portion 30, a mushroom head 31, and an axial bore 32. The annular space produced by the waist portion 30 is in permanent connection with the pressure pipeline 17, and the head 31 is adapted to engage with a relatively sharp seating 33 formed upon the body 25, the valve member 29 thus being enabled to control the flow of pressure liquid from the pipeline 17 to the variable pressure pipeline 23. It will be seen that the valve member 29 is normally urged towards its closed position by a coiled compression spring indicated at 34. A second valve member 35 is arranged to slide within the bore 27 and is recessed to form a seating 36 for the adjacent sharp outer edge 45 of the valve member 29. The external curved surface of the valve member 35 is grooved longitudinally at 37 to permit the passage of liquid back to the reservoir by way of the pipeline 21 when the valve members 29 and 35 are moved apart, and said member is engaged by a projection 38 upon a slidable abutment member 39 against which one end of a spring 40 engages, said spring being herein referred to as the main spring of the control valve device. The force exerted by the spring against the valve member 35 has a predetermined value for every position of the control member 24, and for this purpose a plunger 41 slidable within the end part of the bore 27 engages the main spring 40 and is cup-shaped at its opposite end to receive a ball 42 adapted to bear against an eccentric cam 43 formed in one or connected with the control member 24. The control member 24 and the cam 43 are mounted upon a shaft indicated at 44, and it will be readily seen that as the control member 24 is moved clockwise the plunger 41 tends to compress the main spring 40, the opposite action taking place as the control member 24 is moved in an anti-clockwise direction.

It will be seen that the valve member 29 is always in a state of balance as far as the pressure of the liquid is concerned, primarily owing to the provision of the bore 32, which enables the pressure within the cavity 28 to act on the opposite end face of said valve member 29. This liquid pressure also acts upon that part 46 of the adjacent surface of the valve member 35 which lies inside the circle where the sharp edge 45 engages with the seating 36. Thus the pressure of the liquid tends to force the valve member 35 towards the right against the action of the main spring 40, and the control valve device is so arranged that liquid will be forced into the cavity 28 from the pressure pipeline 17 or allowed to escape from said cavity through the return pipeline 21 until such time as a state of balance is reached, at which point both of the valve members 29 and 35 assume their closed positions. Thus should the control member 24 be moved in an anti-clockwise direction to reduce the force of the spring 40, the pressure of the liquid acting upon the surface 46 of the valve member 35 will be able to overcome the main spring 40, thus separating the seating 36 from the edge 45 and enabling liquid to escape from the pipeline 23 and cavity 28 until a state of balance is again reached. On the other hand, should the liquid pressure be less than that required to balance the spring 40, the latter will act upon the valve member 35, which in turn will move the head 31 out of engagement with its seating 33, thus permitting pressure liquid to enter from the pipeline 17 until such time as the force exerted upon the surface 46 of the valve member 35 balances the main spring 40.

The variable pressure pipeline 23 from the control valve device 19 leads to a cylinder space 47 within the body 50 of the servo valve 18, as will be seen in Figure 1, and is arranged to act upon a piston 48 in order that it may control the operation of an inner valve member 49 formed in one with the piston 48. The lower part of the valve member 49 has a pair of axially spaced enlarged portions 51 and 52, which are slidably mounted within a bore 53 in the lower part of the body 50, the intervening annular space 54 being arranged to serve as a permanent connection between an internal space 55 within the valve member 49 and a passage 56 leading to the return pipeline 20. At its centre part the body 50 is formed with a cavity 57 of relatively large diameter containing a pair of outer valve members 58 and 59, these being telescopically slidable one upon the other in a substantially liquid tight manner as indicated at 60, and being urged apart by a coiled compression spring 61 surrounding both valve members. The valve member 58 is formed at its upper part with an annular projection 62 of somewhat frusto conical shape adapted to engage with the sharp end 63 of the cylinder bore 47, thus isolating the adjacent annular space 64 from the cavity 57. In a similar way the valve member 59 has at its lower part an annular projection 65 adapted to engage with the sharp edge 66 of the bore 53 in order to isolate the annular space 67 from the cavity 57. Further, the upper valve member 58 is formed internally with a shoulder 68 arranged to co-operate with a valve flange or head 69 upon the inner valve member 49, while a similar shoulder 70 formed within the valve member 59 is engageable by a radial flange 71 also upon the inner valve member 49. It will be noted that the two flanges 69 and 71 have their seating parts facing towards one another, and the adjacent portions of the inner valve member 49 pass with considerable clearance through the annular projections 62 and 65 of the outer valve members 58 and 59 respectively; moreover the annular space 72 between the flanges 69 and 71 is in permanent connection with the internal space 55 and the return pipeline 20 owing to the provision of radial holes 73.

The servo cylinder unit 22, which, of course, is only shown diagrammatically and is not to scale by comparison with the servo valve in Figure 1, is double-acting and is provided with a piston 74 having a piston rod 75, this being operatively coupled with the particular device, such as an aircraft flap, which is to be operated by the remote control system in sympathy with movements imparted manually to the control member 24. A bracket 76 is also attached to the piston rod 75 and forms one anchorage of a coiled tension spring 77, the opposite end of which is connected with a lever 78 pivoted to the body 50 as indicated at 79. The opposite end of the lever 78 is engaged at 80 with a somewhat U-shaped tension member 81, the lower end of which is adapted to act in an upward direction at 82 upon the bottom of the inner valve member 49. The upper liquid space 83 of the servo cylinder unit is connected with the annular space 64 of the servo valve 18, while the lower working space 84 is similarly in communication with the annular space 67 of said servo valve 18. The cavity 57 is supplied with pressure liquid from the pipeline 17 by way of a passage 85.

The action of the servo valve and its associated mechanism is as follows. For every position of the piston 74 of the servo cylinder unit 22 a predetermined upward force is exerted upon the tension member 81, due to the stress which is created in the tension spring 77, and this upward force is, of course, counteracted by the liquid pressure existing within the variable pressure pipeline 23 acting downwards upon the piston 48. The parts of the valve are shown in the positions which they occupy when a state of equilibrium or balance has been reached, i. e. when the position of the servo piston 74 is in exact correspondence with the prevailing position of the control member 24. The outer valve members 58 and 59 are pressed outwardly by the spring 61, so that both of the annular projections 62 and 65 are in firm engagement with their corresponding seatings 63 and 66. The flanges 69 and 71 are so arranged that they cannot both simultaneously engage with their seatings 68 and 70, thus ensuring the proper closing of the outer valve members 58 and 59. The inner valve member 49 therefore assumes a position in which the flange 69 engages lightly with its seating 68, thus preventing the escape of working liquid from the space 83 at the upper part of the servo cylinder unit 22 due to the force exerted upon the piston 74 by the spring 77, slight clearance existing between the flange 71 of the inner valve member 49 and its corresponding seating 70. When the control member 24 is moved, say, in a downward direction, this has the effect of increasing the pressure in the pipeline 23, with the result that the downward force upon the inner valve member 49 is increased, thus enabling said inner valve member 49 to move downwardly against the influence of the spring 77. In doing so the flange 69 bearing against its seating 68 depresses the outer valve member 58, thus creating an opening between the projection 62 and its seating 63. This permits pressure liquid to flow from the pipeline 17 into the cavity 57 and thence to the upper working space 83 of the servo cylinder unit 22, said liquid pushing down the piston 74 and consequently increasing the tension in the spring 77. During this movement the liquid expelled from the lower working space 84 can pass freely into the annular space 67 and thence through the space between the flange 71 and its seating 70 to the space 55, passageway 56, and back to the reservoir 12. When the piston 74 reaches a position corresponding to the new setting of the control member 24, the upward force exerted by the spring 77 upon the inner valve member 49 is able to overcome the pressure in the pipeline 23 and a state of balance is reached, the upper valve member 58 closing and the parts of the valve resuming the positions shown in Figure 1. In a similar manner when the control member 24 is moved upwards the pressure in the pipeline 23 is reduced and the force exerted by the tension spring 77 is able to lift the inner valve member 49. As a result the flange 71 first engages with its seat 70 and then lifts the outer valve member 59 so that the projection 65 thereon leaves its seating 66. This, of course, permits pressure liquid to flow from the cavity 57 to flow into the lower working space 84 of the servo cylinder unit 22, the upward movement of the inner valve member 49 causing the flange 69 to leave its seating 68, thus permitting the liquid within the upper working space 83 to pass back to the reservoir 12 by way of the annular space 72, the internal space 55 of the inner valve member 49, and the passageway 56. It will thus be seen that for every position of the servo piston 74 a predetermined force is exerted by the tension spring 77 irrespective of the actual load upon the said piston, and therefore the latter automatically assumes a position which corresponds with that occupied by the control member 24. Moreover the pressure which exists in the pipeline 23 is dependent solely upon the force which is exerted by the main spring 40 of the control valve device 19, so that pressure variations in the delivery of the pump 10 have no effect on the accuracy of the system provided, of course, that said pressure is greater than the maximum pressure required in the pipeline 23. With this end in view each of the valve members of the servo valve, namely the members 49, 58 and 59, and also the valve member 29 of the control valve device, is arranged to be in a perfectly balanced state as far as the liquid pressure acting upon it is concerned. This gives the additional advantage that the accuracy of the system is not affected by expansion and contraction of the parts or of the working liquid due to changes in temperature, since the pressure of the liquid in the pipeline 23 is automatically maintained at the desired value by the control valve device 19.

It will be appreciated that the system described is given merely by way of example and that various modifications may be made. For instance, a single control valve device 19 may be adapted to operate a plurality of servo cylinder units, each being provided with its own servo valve 18 operated by a branch from the pipeline 23, said servo valve, of course, having a pair of main pressure and return pipelines. Moreover other forms of valve device may be used and various constructions of regulating valve are suitable for employment as the control valve device 19.

The improved form of system may be used for any control purpose and it is particularly useful as above mentioned for the control of landing flaps on aircraft, where it is desirable to be able to set the flaps to any position within their operative range.

What I claim is:

1. In a liquid pressure remote control system including a source of liquid under pressure, a pressure regulating valve connected thereto, means for adjusting the pressure of the liquid issuing from said valve and a double-acting piston and cylinder unit driven by said liquid from said source under the control of said regulating valve, a servo valve comprising, a hollow valve body in communication with the source of liquid pressure and each of the working spaces of the unit, an inner valve member in communication with said regulating valve and adapted to be urged in one direction by the liquid under pressure issuing therefrom, a spring operatively connected with the movable part of the unit for urging said inner valve in the other direction, and a pair of outer valve members operated by said inner valve member, said outer valve members each cooperating with the valve body to control the supply of pressure liquid to one working space of the unit, the outer valve members being arranged to cooperate telescopically and being urged apart by a spring to seat normally on an edge of the valve body and thus cut off the supply of pressure liquid to both sides of the unit.

2. In a liquid pressure remote control system including a source of liquid under pressure, a pressure regulating valve connected thereto, means for adjusting the pressure of the liquid issing from said valve and a double-acting piston and cylinder unit driven by said liquid from said source under the control of said regulating valve, a servo valve comprising, a hollow valve body in communication with the source of liquid pressure and each of the working spaces of the unit, an inner valve member in communication with said regulating valve and adapted to be urged in one direction by the liquid under pressure issuing therefrom, a spring operatively connected with the movable part of the unit for urging said inner valve in the other direction, a pair of outer valve members operated by said inner valve member, said outer valve members each cooperating with the valve body to control the supply of pressure liquid to one working space of the unit, the inner valve member having a pair of radial flanges provided with valve seatings facing towards one another, and corresponding seatings upon the respective outer valve members adapted to engage with said first valve seatings for the purpose of moving one or the other of said outer valve members according to the direction in which the inner valve member is moved.

3. In a liquid pressure remote control system including a source of liquid under pressure, a pressure regulating valve connected thereto, means for adjusting the pressure of the liquid issuing from said valve and a double-acting piston and cylinder unit driven by said liquid from said source under the control of said regulating valve, a servo valve comprising, a hollow valve body in communication with the source of liquid pressure and each of the working spaces of the unit, an inner valve member in communication with said regulating valve and adapted to be urged in one direction by the liquid under pressure issuing therefrom, a spring operatively connected with the movable part of the unit for urging said inner valve in the other direction, a pair of outer valve members operated by said inner valve member, said outer valve members each cooperating with the valve body to control the supply of pressure liquid to one working space of the unit, the inner valve member having a pair of radial flanges provided with valve seatings facing towards one another, corresponding seatings upon the respective outer valve members adapted to engage with said first valve seatings for the purpose of moving one or the other of said outer valve members according to the direction in which the inner valve member is moved, means defining a space bounded by that part of the inner valve member between the flanges and the outer valve members, means establishing a permanent connection between said space and the intake side of said source of liquid under pressure, and means establishing a permanent connection between the exhaust side of said source of pressure liquid and the outside of said valve members.

4. In a liquid pressure remote control system including a source of liquid under pressure, a pressure regulating valve connected thereto, means for adjusting the pressure of the liquid issuing from said valve and a double-acting piston and cylinder unit driven by said liquid from said source under the control of said regulating valve, a servo valve comprising, a hollow valve body in communication with the source of liquid pressure and each of the working spaces of the unit, an inner valve member in communication with said regulating valve and adapted to be urged in one direction by the liquid under pressure issuing therefrom, a spring operatively connected with the movable part of the unit for urging said inner valve in the other direction, a pair of outer valve members operated by said inner valve member, said outer valve members each cooperating with the valve body to control the supply of pressure liquid to one working space of the unit, the inner valve member having a pair of radial flanges provided with valve seatings facing towards one another, corresponding seatings upon the respective outer valve members adapted to engage with said first valve seatings for the purpose of moving one or the other of said outer valve members according to the direction in which the inner valve member is moved, the flanges on the inner valve member being spaced apart a distance such that at any one time only one of said flanges is seated on its respective outer valve member thus ensuring that both of the outer valve members can engage fully with their respective seatings when the valve has reached a state of equilibrium.

5. In a liquid pressure remote control system including a source of liquid under pressure, a pressure regulating valve connected thereto, means for adjusting the pressure of the liquid issuing from said valve and a double-acting piston and cylinder unit driven by said liquid from said source under the control of said regulating valve, a servo valve comprising, a hollow valve body in communication with the source of liquid pressure and each of the working spaces of the unit, an inner valve member in communication with said regulating valve and adapted to be urged in one direction by the liquid under pressure issuing therefrom, a spring operatively connected with the movable part of the unit for urging said inner valve in the other direction, a pair of outer valve members operated by said inner valve member, said outer valve members each cooperating with the valve body to control the supply of pressure liquid to one working space of the unit, said spring being connected to the movable part of the unit, and a link and lever device connected to said inner valve member and to said spring, whereby the thrust of said spring in its action on said inner valve member will be given a mechanical advantage.

PETER WARBORN THORNHILL.